United States Patent
Chang et al.

(10) Patent No.: US 11,388,777 B2
(45) Date of Patent: Jul. 12, 2022

(54) DOWNLINK CONTROL INFORMATION (DCI) FORMAT FOR GRANT-LESS UPLINK TRANSMISSION (GUL)

(71) Applicant: Apple Inc., Cupertino, CA (US)

(72) Inventors: Wenting Chang, Beijing (CN); Jinyu Zhang, Beijing (CN); Huaning Niu, San Jose, CA (US); Jeongho Jeon, San Jose, CA (US); Salvatore Talarico, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/605,784

(22) PCT Filed: May 15, 2018

(86) PCT No.: PCT/US2018/032777
§ 371 (c)(1),
(2) Date: Oct. 16, 2019

(87) PCT Pub. No.: WO2018/213315
PCT Pub. Date: Nov. 22, 2018

(65) Prior Publication Data
US 2020/0128621 A1    Apr. 23, 2020

Related U.S. Application Data

(60) Provisional application No. 62/508,121, filed on May 18, 2017, provisional application No. 62/517,664, filed on Jun. 9, 2017.

(51) Int. Cl.
*H04W 88/06* (2009.01)
*H04W 76/11* (2018.01)
(Continued)

(52) U.S. Cl.
CPC ......... *H04W 88/06* (2013.01); *H04L 1/0003* (2013.01); *H04L 1/1614* (2013.01);
(Continued)

(58) Field of Classification Search
None
See application file for complete search history.

(56) References Cited

U.S. PATENT DOCUMENTS 10,750,491 B2 * 8/2020 Talarico ............ H04W 72/048
2016/0270102 A1   9/2016 Zeng et al.
(Continued)

FOREIGN PATENT DOCUMENTS

WO    2016167828    10/2016

OTHER PUBLICATIONS

International Search Report and Written Opinion for PCT Application No. PCT/US18/32777, dated Aug. 8, 2018.

*Primary Examiner* — Anh Vu H Ly
(74) *Attorney, Agent, or Firm* — Sterne, Kessler, Goldstein & Fox P.L.L.C.

(57) ABSTRACT

Described is an apparatus of a User Equipment (UE). The apparatus may comprise a first circuitry and a second circuitry. The first circuitry may be operable to process a first Downlink Control Information (DCI) format 0A transmission indicating a Grant-less Uplink (GUL) activation. The first circuitry may also be operable to process a second DCI format 0A transmission indicating a GUL release. The second circuitry may be operable to generate one or more Uplink (UL) transmissions for an unlicensed spectrum of the wireless network after the GUL activation and before the GUL release.

23 Claims, 8 Drawing Sheets

(51) Int. Cl.
*H04L 1/00* (2006.01)
*H04L 1/16* (2006.01)
*H04L 1/18* (2006.01)
*H04L 5/00* (2006.01)
*H04W 16/14* (2009.01)
*H04W 72/04* (2009.01)
*H04W 72/12* (2009.01)
*H04W 74/08* (2009.01)

(52) U.S. Cl.
CPC .......... *H04L 1/1819* (2013.01); *H04L 5/0055* (2013.01); *H04W 16/14* (2013.01); *H04W 72/042* (2013.01); *H04W 72/1284* (2013.01); *H04W 74/0808* (2013.01); *H04W 76/11* (2018.02)

(56) References Cited

U.S. PATENT DOCUMENTS

| | | | |
|---|---|---|---|
| 2016/0309354 A1 | 10/2016 | Yerramalli et al. | |
| 2018/0139774 A1* | 5/2018 | Ma | H04L 1/189 |
| 2018/0324889 A1* | 11/2018 | Babaei | H04L 5/0053 |
| 2019/0174472 A1* | 6/2019 | Lee | H04W 72/042 |
| 2019/0372719 A1* | 12/2019 | Talarico | H04W 72/042 |
| 2020/0022174 A1* | 1/2020 | Karaki | H04W 72/1284 |
| 2020/0092044 A1* | 3/2020 | Park | H04W 28/04 |
| 2020/0092858 A1* | 3/2020 | Ye | H04L 1/1861 |
| 2020/0107357 A1* | 4/2020 | Chang | H04W 72/048 |
| 2021/0099268 A1* | 4/2021 | Yan | H04L 1/1671 |

* cited by examiner

DOWNLINK CONTROL INFORMATION (DCI) FORMAT FOR GRANT-LESS UPLINK TRANSMISSION (GUL)

CLAIM OF PRIORITY

The present application is a National Stage Entry of and claims priority to International Patent Application Serial Number PCT/US18/32777, filed May 15, 2018 and entitled DOWNLINK CONTROL INFORMATION (DCI) FORMAT FOR GRANT-LESS UPLINK TRANSMISSION (GUL), which claims priority under 35 U.S.C. § 119(e) to U.S. Provisional Patent Application Ser. No. 62/508,121 filed May 18, 2017, and to U.S. Provisional Patent Application Ser. No. 62/517,664 filed Jun. 9, 2017, which are herein incorporated by reference in their entireties for all purposes.

BACKGROUND

A variety of wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system. Next-generation wireless cellular communication systems may provide support for higher bandwidths in part by using unlicensed spectrum

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
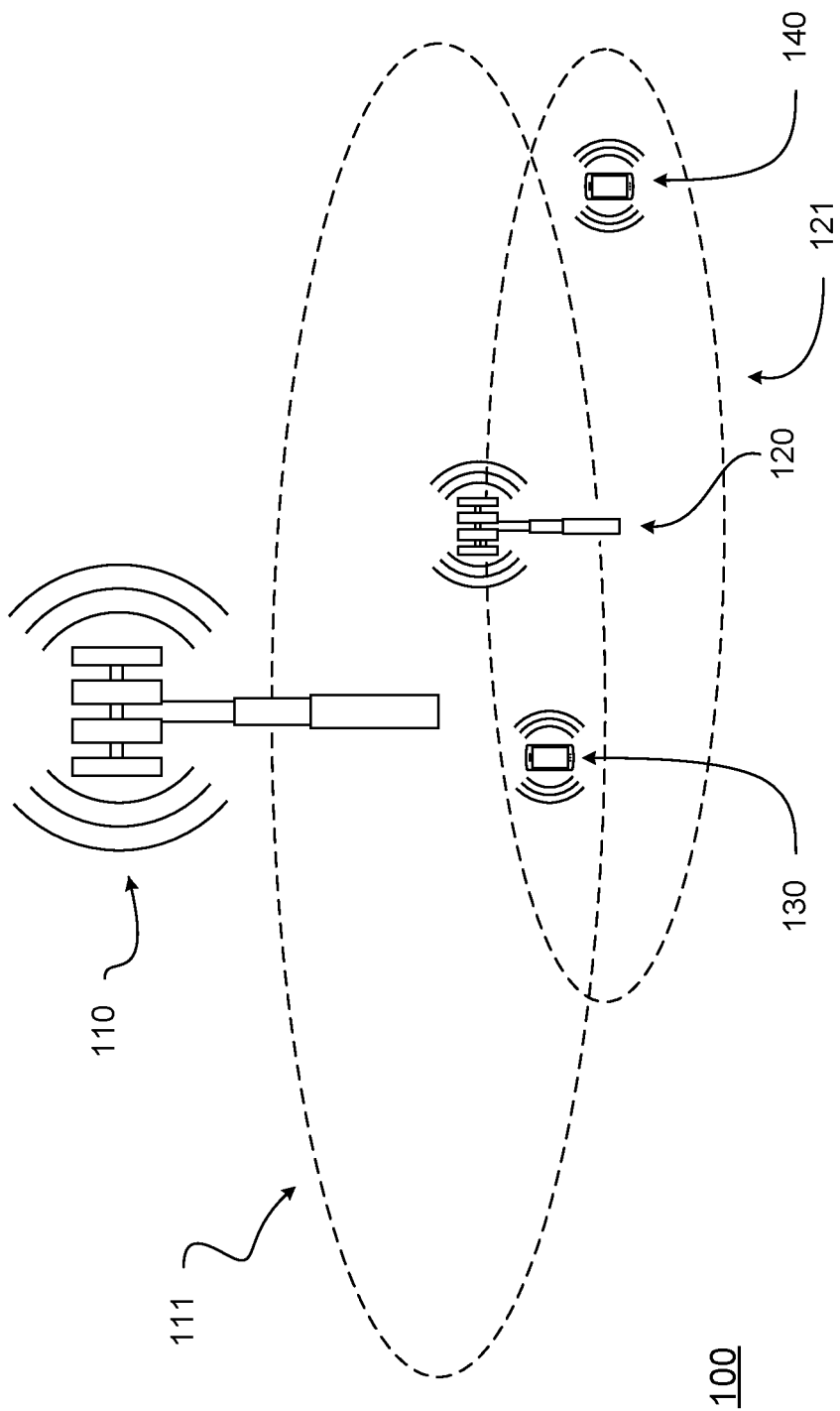
FIG. 1 illustrates a scenario of one or more Evolved Node Bs (eNBs) and one or more User Equipments (UEs), in accordance with some embodiments of the disclosure.

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced (LTE-A) system, and a 5th Generation (5G) wireless system/5G mobile networks system.

Due to the popularity of mobile devices and smart devices, the widespread adoption of wireless broadband has resulted in significant growth in the volume of mobile data traffic and has radically impacted system requirements, sometimes in divergent ways. For example, while it may be important to lower complexity, elongate battery life, and support highly mobility and service continuity of devices, it may also be important to increase data rates and bandwidths and lower latencies to support modern applications.

In order to meet the needs of future wireless networks, several new physical layer techniques have been introduced in the recent years, e.g., multiple-input multiple-output (MIMO) techniques, enhanced Inter-Cell Interference Coordination (eICIC), coordinated multi-point designs, etc.

To meet the needs of future wireless networks, various physical layer techniques have been introduced (e.g, Multiple Input Multiple Output (MIMO) techniques, enhanced Inter-Cell Interference Coordination (ICIC) designs, coordinated multi-point designs, and so on). An increasing interest has also arisen in operating cellular networks in unlicensed spectrum to ameliorate the scarcity of licensed spectrum in low frequency bands, with the aim to further improve data rates. One enhancement for LTE in 3GPP Release 13 has been to enable operation in unlicensed spectrum via Licensed-Assisted Access (LAA), which may expand a system bandwidth by utilizing a flexible carrier aggregation (CA) framework introduced by the LTE-Advanced system. Enhanced operation of LTE systems in unlicensed spectrum is also expected in future releases, as well as in 5G systems.

Potential LTE operations in unlicensed spectrum may include (but not be limited to) LTE system operation in the unlicensed spectrum via Dual Connectivity (DC) (e.g., DC-based LAA). Potential LTE operations in unlicensed spectrum may also include LTE-based technology operating solely in unlicensed spectrum without relying upon an "anchor" in licensed spectrum, such as in MulteFire™ technology by MulteFire Alliance of Fremont Calif., USA. Standalone LTE operation in unlicensed spectrum, e.g., MulteFire™ technology, may combine performance benefits of LTE technology with a relative simplicity of Wi-Fi®-like deployments. (Wi-Fi® is a registered trademark of the Wi-Fi Alliance of Austin, Tex., USA.) Standalone LTE operation may accordingly be an advantageous technology in meeting demands of ever-increasing wireless traffic.

An unlicensed-spectrum frequency band of current interest for 3GPP systems is the 5 gigahertz (GHz) band, which may present a wide spectrum with global common availability. The 5 GHz band in the US is governed by Unlicensed National Information Infrastructure (U NII) rules of the Federal Communications Commission (FCC). The primary incumbent systems in the 5 GHz band may be Wireless Local Area Networks (WLAN) systems, specifically those based on IEEE 802.11 a/n/ac technologies. Since WLAN systems may be widely deployed both by individuals and operators for carrier-grade access service and data offloading, sufficient care should be taken before deployment of coexisting 3GPP systems.

Accordingly, Listen-Before-Talk (LBT) may be a feature of Release 13 LAA systems to promote fair coexistence with incumbent systems. In an LBT procedure, a radio transmitter may first sense a medium and may transmit if the medium is sensed to be idle.

Meanwhile, in scheduled-based Uplink (UL) designs, UL Physical Uplink Shared Channel (PUSCH) transmission may be determined based on explicit UL grant transmission via Physical Downlink Control Channel (PDCCH) (e.g., via Downlink Control Information (DCI) format 0). UL grant transmission may be performed after completing an LBT procedure at an Evolved Node-B (eNB). After receiving an UL grant, a scheduled User Equipment (UE) may perform a short LBT or Category 4 (Cat 4) LBT during an allocated time interval. If the LBT is successful at the scheduled UE, then UE may transmit PUSCH on resources indicated by the UL grant.

Due to the double LBT requirement at both eNB (when sending the UL grant) and at the scheduled UEs (before UL transmission), UL performance in unlicensed spectrum may be significantly degraded by UL starvation. This is a general problem when a scheduled system (such as LTE) coexists with a non-scheduled autonomous system (such as Wi-Fi®).

Accordingly, in various embodiments, autonomous UL (AUL) transmission (which may also be referred to as Grant-less UL (GUL) transmission) may be employed to improve the performance of UL transmission. GUL may be activated, released, and configured in a variety of manners, as discussed herein in further details.

In some embodiments, in order to improve the communication system performance in the unlicensed spectrum (e.g., due to the double LBT requirement), the UE may perform GUL transmission, where the eNB does not transmit UL grant for physical uplink shared channel (PUSCH) transmissions and/or Physical Uplink Control Channel (PUCCH) transmissions by the UE. In this regard, the double LBT requirement can be alleviated when GUL transmission by the UE takes place, since the eNB will not perform LBT, and LBT may be performed merely by the UE. Since the UE performing grantless UL transmission does not have to wait for an UL grant by the eNB, any additional delay for accessing a channel for UL transmission may be eliminated or reduced, contributing to performance improvement.

Thus, in GUL scenarios, the UE may perform an LBT procedure on the unlicensed spectrum to determine if one of the channels in the unlicensed spectrum is available. The UE may send the UL transmissions (e.g., PUSCH, PUCCH, etc.) without a prior UL grant from the eNB, upon a determination that the one of the channels in the unlicensed spectrum is available.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

FIG. 1 illustrates a scenario of one or more eNBs and one or more UEs, in accordance with some embodiments of the disclosure. A scenario 100 may comprise a first eNB 110 serving a first cell 111 and a second eNB 120 serving a second cell 121. A first UE 130 may be positioned with respect to the first cell 111 and the second cell 121 in such a way as to permit wireless communication with both the first eNB 110 and the second eNB 120, whereas a second UE 140 may be positioned with respect to the first cell 111 and the second cell 121 in such a way as to permit wireless communication merely with the second eNB 120.

In an example, the first eNB 110 may support both DC-based LAA in unlicensed spectrum and standalone access in unlicensed spectrum, while second eNB 120 may merely support standalone access in unlicensed spectrum. Accordingly, first UE 130 may employ either DC-based LAA in unlicensed spectrum or standalone access in unlicensed spectrum, while second UE 140 may employ standalone access in unlicensed spectrum.

Either the first UE 130 or the second UE 140 may employ GUL transmission, may employ GUL activation to activate GUL transmission, may employ GUL release to release or terminate GUL transmission, etc. For example, the first UE 130 may employ GUL transmission to communicate with the first eNB 110 and/or the second eNB 120. In another example, the second UE 140 may employ GUL transmission to communicate with the second eNB 120.

In some embodiments, the GUL mode at UE side may be activated and/or released by DCI from its serving eNB, e.g., to avoid conflict. Moreover, the grant-less UL transmission may require control information from the eNB, e.g., an appropriate Modulation and coding scheme (MCS), hybrid automatic repeat request (HARQ) ACK/NACK bitmap for retransmission, TPC (transmit power control) command, etc. In some embodiments, a UE may receive one or more DCIs for GUL activation, one or more DCI for GUL configuration and for previous GUL transmission feedback (e.g., also referred to as GUL-DCI, or G-DCI), one or more DCI for GUL release, and/or the like.

As will be discussed in further details herein, in some embodiments, existing DCI formats (e.g., which are used for scheduled UL transmission) may be reused for G-DCI, DCIs for GUL activation, DCIs for GUL release, and/or the like. From the perspective of UE blind detection, it may be preferable to reuse existing DCI formats (e.g., with the same length as the existing DCI formats). In addition, UE specific DCI may be preferred. In an example, some existing DCI formats (e.g., DCIs used for scheduled UL transmissions) that may be potentially used for GUL are as follows:

TABLE 1

| DCI | 0A | 0B | 4A | 4B |
|---|---|---|---|---|
| 10 MHz | 39~41 | 38~41 + 2N | 48~53 | 45~51 + 3N |
| 20 MHz | 41~43 | 40~43 + 2N | 50~55 | 47~53 + 3N |

Thus, as seen in Table 1, DCI formats 0A, 0B, 4A, 4B, and/or the like may be used for DCI signaling for scheduled UL transmission scenarios (e.g., in the unlicensed spectrum), where N in Table 1 may be a number of subframes scheduled for transmission, and 10 Mega Hertz (MHz) and 20 MHz may be possible bandwidths to be used for transmission (e.g., in the unlicensed spectrum). Merely as examples, for 10 MHz and 20 MHz bandwidths, DCI format 0A may about 39 to 41 bits, and about 41 to 43 bits, respectively. In some embodiments, one or more of the DCI formats 0A, 0B, 4A, and 4B of Table 1 may be used for transmission of DCIs in GUL transmission scenarios.

As previously alluded to, in the GUL transmission scenarios, at least three types of DCIs may be used by the eNB to transmit control data to the UE: (i) GUI-DCIs, or simply referred to as G-DCI, which may be used by the eNB to transmit UE specific control information to the UE (e.g., HARQ ACK/NCK bitmap feedback for previous grant-less UL transmissions, MCS information, TPC information, etc.), (ii) DCIs for GUL activation (also referred to as GUL-activation DCIs) to activate or initiate GUL transmission, and (iii) DCIs for GUL release (also referred to as GUL-release DCIs) to release or terminate GUL transmission.

In some embodiments, one or more of the DCI formats of Table 1 (e.g., one or more of DCI formats 0A, 0B, 4A, or 4B) may be configured by Radio Resource Control (RRC) and used for G-DCI. In an example, the DCI format may be compacted (e.g., up to x bits), and may contain HARQ bitmap, possibly along with TPC bits and MCS bits, where x may be a configurable number. The compacting may be achieved by, for example, removing redundant bits (e.g., which may not be used to transmit any meaningful information) from the DCI format.

In another example, the DCI format may be extended (e.g., up to y bits), and may contain HARQ bitmap, MCS bits, and TPC bits, where y may be a configurable number. Thus, in the extended format for a DCI, the DCI used in GUL scenarios may not be truncated or compacted relative to the DCIs used for scheduled UL transmissions in unlicensed spectrum or DCIs used in legacy LTE (e.g., DCIs used for transmission in the licensed spectrum).

For example, if one transmission block (TB) is assigned for grant-less uplink transmission, then the G-DCI may comprise at least one or more of 16 HARQ bitmap bits, 5 MCS bits, and 2 TPC bits, e.g., one or more of at least these 23 bits. In another example, if two TBs are assigned for grant-less uplink transmission, then the G-DCI may comprise one or more of: 32 HARQ bitmap bits, 10 MCS bits, and 2 TPC bits, e.g., one or more of at least these 44 bits.

Table 2 illustrates an example mapping between various DCI formats, bandwidth (in MHz), and number of TBs assigned for GUL transmissions.

TABLE 2

|  | DCI format | 0A | 0B | 4A | 4B |
|---|---|---|---|---|---|
| 1 TB | 10 MHz | Y | Y | Y | Y |
| (23) | 20 MHz | Y | Y | Y | Y |
| 2 TBs | 10 MHz | N | Y | Y | Y |
| (44) | 20 MHz | N | Y | Y | Y |

In Table 2, "N" indicates "No," e.g., the corresponding DCI format may not be used; and "Y" indicates "Yes," e.g., the corresponding DCI format may be used. For example, for 1 TB assignment, any one of DCI formats 0A, 0B, 4A, or 4B may be used for either 10 MHz bandwidth in unlicensed spectrum, or for 20 MHz bandwidth in unlicensed spectrum. As indicated in Table 2, the DCI format for the 1 TB scenario may have 23 bits. For 2 TB assignment, any one of DCI formats 0B, 4A, or 4B (but not DCI format 0A) may be used for either 10 MHz bandwidth in unlicensed spectrum, or for 20 MHz bandwidth in unlicensed spectrum. As indicated in Table 2, the DCI format for the 2 TB scenario may have 44 bits.

However, in some other embodiments, contrary to Table 2, in some embodiments, DCI format 0A may be used for transmission in GUL transmission as well.

In some embodiments, the DCI format 0A may be utilized for G-DCI. For example, the DCI format 0A may be used for a compacted G-DCI (e.g., compacted to include x bits comprising HARQ bitmap, possibly along with TPC bits and/or MCS bits). In another example, the DCI format 0A may be used for an expanded G-DCI (e.g., expanded to include y bits comprising HARQ bitmap, TPC bits and MCS bits).

Discussed below are various possible options for G-DCI for 1 and 2 TB scenarios.

Option 1: For example, for the 1 TB assignment of GUL transmission, the DCI format 0A may include the contents (e.g., all the contents) in the G-DCI for both 10 MHz and 20 MHz bandwidth cases. For either extended or compacted G-DCI, the HARQ bitmap, the TPC bits, and/or the MCS bits can be included in the G-DCI.

Option 2A: For 2 TB case, in one example, the G-DCI may include 2*N bits HARQ bitmap, where N is the configured GUL HARQ process number (e.g., N may be indicative of a number of adjacent processes to be used for GUL transmission).

Option 2B: For 2 TB case, in another example, the G-DCI may include 2*N bits HARQ bitmap and 2 bits TPC, where N is the configured GUL HARQ process number (e.g., N may be indicative of a number of adjacent processes to be used for GUL transmission).

Option 2C: For 2 TB case, in another example, the G-DCI may include 2*N bits HARQ bitmap and 5 bits MCS, where N is the configured GUL HARQ process number (e.g., N may be indicative of a number of adjacent processes to be used for GUL transmission).

Option 2D: For 2 TB case, in another example, the G-DCI may include 2*N bits HARQ bitmap, 5 bits MCS, and between 1 to 4 bit differential MCS, where N is the configured GUL HARQ process number (e.g., N may be indicative of a number of adjacent processes to be used for GUL transmission).

Option 2E: For 2 TB case, in another example, the G-DCI may include 2*N bits HARQ bitmap, and 10 bits MCS, where N is the configured GUL HARQ process number (e.g., N may be indicative of a number of adjacent processes to be used for GUL transmission).

Option 2F: For 2 TB case, in another example, the G-DCI may include 2*N bits HARQ bitmap, 2 bits TPC, and 5 bits MCS, where N is the configured GUL HARQ process number (e.g., N may be indicative of a number of adjacent processes to be used for GUL transmission).

Option 2G: For 2 TB case, in another example, the G-DCI may include 2*N bits HARQ bitmap, 2 bits TPC, 5 bits MCS, and between 1 to 4 bit differential MCS, where N is the configured GUL HARQ process number (e.g., N may be indicative of a number of adjacent processes to be used for GUL transmission).

Option 2H: For 2 TB case, in yet another example, the G-DCI may include 2*N bits HARQ bitmap, 2 bits TPC, and 10 bits MCS, where N is the configured GUL HARQ process number (e.g., N may be indicative of a number of adjacent processes to be used for GUL transmission).

In some embodiments, either the compacted or extended format for the G-DCI may be adopted, e.g., for one or more of the G-DCI options discussed herein.

In some embodiments, the format of G-DCI may be determined based on the configured GUL HARQ process number N. After N is determined, the bit length for TPC, MCS, and/or differential MCS may be decided (e.g., may be selected from any of the options 1, 2A, . . . 2H discussed herein above).

In a G-DCI, not all bits may be used for transmission of useful information. In some embodiments, such redundant or dummy bits of the G-DCI may be set to zero. Put differently, one or more redundant or dummy bits (e.g., having values of zero) may be appended or padded to the G-DCI, such that the G-DCI may have a pre-determined length (e.g., where the pre-determined length may be the length of DCIs used for scheduled transmission in unlicensed spectrum, or may be the length of DCIs used in licensed spectrum). Additional of such redundant bits may ensure uniformity of DCI lengths across GUL scenarios, scenarios for scheduled transmission in unlicensed spectrum, and scenarios for transmission in licensed spectrum. In an example, without addition of such redundant bits, some information may be compressed or omitted.

Table 3A illustrates example content of G-DCI for scenarios associated with 10 MHz bandwidth in unlicensed spectrum, and Table 3B illustrates example content of G-DCI for scenarios associated with 20 MHz bandwidth in unlicensed spectrum. Note for the compacted G-DCI format, the parameters of TPC, MCS, and/or differential MCS may or may not be included in the G-DCI.

TABLE 3A (for 10 MHz bandwidth system)

|  | Without TPC | | | With TPC | | | |
| --- | --- | --- | --- | --- | --- | --- | --- |
| Number of HARQ | 16 | 15 | <=14 | 16 | 15 | 14 | <=13 |
| HARQ bitmap | 32 | 30 | <=28 | 32 | 30 | 28 | 26 |
| TPC | — | — | — | 2 | 2 | 2 | 2 |
| TB1 MCS | 5 | 5 | 5 | 5 | 5 | 5 | 5 |
| TB2 MCS | 2~4 MCS differential | 4 differential MCS or 5 MCS | 5 | 0~2 MCS differential | 2~4 MCS differential | 4 differential MCS or 5 MCS | 5 |
| total | 39~41 | 39~40 | <=38 | 39~41 | 39~41 | 39~40 | <=38 |

TABLE 3B (for 20 MHz bandwidth system)

|  | Without TPC | | With TPC | | |
| --- | --- | --- | --- | --- | --- |
| # HARQ | 16 | <=15 | 16 | 15 | <=14 |
| HARQ bitmap | 32 | <=30 | 32 | 30 | <=28 |
| TPC | — | — | 2 | 2 | 2 |
| TB1 MCS | 5 | 5 | 5 | 5 | 5 |
| TB2 MCS | 4 differential MCS or 5 MCS | 5 | 2~4 MCS differential | 4 differential MCS or 5 MCS | 5 |
| total | 41~42 | <=40 | 41~43 | 41~42 | <=40 |

In some embodiments, in a 2 TB scenario, the 5 bit MCS index for the second TB may be replaced as a differential MCS in respect with that for the first TB.

In some embodiments, a length of differential MCS may range from 1 bit to 4 bits. In some embodiments, in a 2 TB scenario, the MCS for the second TB (e.g., $MCS_{TB2}$) may be calculated based on the MCS for the first TB (e.g., $MCS_{TB1}$) and a differential MCS value. Calculation of the MCS for the second TB (e.g., $MCS_{TB2}$), based on the MCS for the first TB (e.g., $MCS_{TB1}$) and the differential MCS value, may be in accordance with the following Table 4:

TABLE 4

| Indicator | Differential | Indicator | Differential |
| --- | --- | --- | --- |
| "0" | $MCS_{TB2} = MCS_{TB1}$ | "1" | $MCS_{TB2} = MCS_{TB1} - 2$ |
| "00" | $MCS_{TB2} = MCS_{TB1}$ | "01" | $MCS_{TB2} = MCS_{TB1} - 2$ |
| "10" | $MCS_{TB2} = MCS_{TB1} - 4$ | "11" | $MCS_{TB2} = MCS_{TB1} - 6$ |
| "000" | $MCS_{TB2} = MCS_{TB1}$ | "001" | $MCS_{TB2} = MCS_{TB1} - 2$ |
| "010" | $MCS_{TB2} = MCS_{TB1} - 4$ | "011" | $MCS_{TB2} = MCS_{TB1} - 6$ |
| "100" | $MCS_{TB2} = MCS_{TB1} - 8$ | "101" | $MCS_{TB2} = MCS_{TB1} - 10$ |
| "110" | $MCS_{TB2} = MCS_{TB1} - 12$ | "111" | $MCS_{TB2} = MCS_{TB1} - 14$ |
| "0000" | $MCS_{TB2} = MCS_{TB1}$ | "0001" | $MCS_{TB2} = MCS_{TB1} - 2$ |
| "0010" | $MCS_{TB2} = MCS_{TB1} - 4$ | "0011" | $MCS_{TB2} = MCS_{TB1} - 6$ |
| "0100" | $MCS_{TB2} = MCS_{TB1} - 8$ | "0101" | $MCS_{TB2} = MCS_{TB1} - 10$ |
| "0110" | $MCS_{TB2} = MCS_{TB1} - 12$ | "0111" | $MCS_{TB2} = MCS_{TB1} - 14$ |
| "1000" | $MCS_{TB2} = MCS_{TB1} - 1$ | "0001" | $MCS_{TB2} = MCS_{TB1} - 3$ |
| "0010" | $MCS_{TB2} = MCS_{TB1} - 5$ | "0011" | $MCS_{TB2} = MCS_{TB1} - 7$ |
| "0100" | $MCS_{TB2} = MCS_{TB1} - 9$ | "0101" | $MCS_{TB2} = MCS_{TB1} - 11$ |
| "0110" | $MCS_{TB2} = MCS_{TB1} - 13$ | "0111" | $MCS_{TB2} = MCS_{TB1} - 15$ |

As illustrated in Table 4, the differential MCS value (e.g., the indicator of Table 4) may be a single bit, 2 bits, 3 bits, 4 bits, or the like. Merely as an example, if the indicator of Table 4 is 0, then $MCS_{TB2}=MCS_{TB1}$. Merely as an example, if the indicator of Table 4 is 010, then $MCS_{TB2}=MCS_{TB1}-4$. Thus, in some embodiments, in the 2 TB scenario, the MCS for the second TB (e.g., $MCS_{TB2}$) may be determined based on the MCS for the first TB (e.g., $MCS_{TB1}$) and the differential MCS value (e.g., the indicator) using Table 4.

In some embodiments, the differential MCS value may be indicated as being proportion to $MCS_{TB1}$, and a granularity of the differential MCS indication may be determined by a length of the differential MCS indication, as follows:

For 1 bit, $\{MCS_{TB1}, 0\}$.  Equation 1

For 2 bit, $\left\{MCS_{TB1}, \left\lfloor \frac{2*MCS_{TB1}}{3} \right\rfloor, \left\lfloor \frac{MCS_{TB1}}{3} \right\rfloor, 0\right\}$.  Equation 2

For 3 bit, $\left\{MCS_{TB1}, \left\lfloor \frac{6*MCS_{TB1}}{7} \right\rfloor, \left\lfloor \frac{5*MCS_{TB1}}{7} \right\rfloor \ldots 0\right\}$.  Equation 3

For 4 bit, $\left\{MCS_{TB1}, \left\lfloor \frac{14*MCS_{TB1}}{15} \right\rfloor, \left\lfloor \frac{13*MCS_{TB1}}{15} \right\rfloor \ldots 0\right\}$.  Equation 4

Thus, for a single bit differential MCS, $MCS_{TB2}$ may have a value of either 0, or $MCS_{TB1}$ (e.g., based on the value of the differential MCS), as seen in equation 1. In another example, for a two bit differential MCS, $MCS_{TB2}$ may have a value of either 0, $\left\lfloor \frac{5*MCS_{TB1}}{7} \right\rfloor, \left\lfloor \frac{6*MCS_{TB1}}{7} \right\rfloor,$ or $MCS_{TB1}$ (e.g., based on the value of the differential MCS), as seen in equation 2.

In some embodiments, the DCI format 0A may be utilized for compacted G-DCI transmission, while a DCI format larger than 44 bits (e.g., DCI format 0B, 4A, 4B) may be utilized for extended G-DCI.

As previously alluded herein, other than the G-DCI, a GUL system in the unlicensed spectrum may also use a DCI for GUL activation (also referred to as GUL-activation DCI) to activate or initiate GUL transmission, and/or a DCI for GUL release (also referred to as GUL-release DCI) to release or terminate GUL transmission.

In some embodiments, DCIs for GUL activation and/or release (e.g., GUL-activation DCI and/or GUL-release DCI) may comprise one or more of: MCS bits (e.g., 5 MCS bits), demodulation reference signal (DMRS) (e.g., 3 bit DMRS in legacy LTE, or 5 bit DMRS), a TB number configuration (e.g., 1 bit having value "0" for 1 TB, and "1" for 2 TBs, or vice versa), layer number (e.g., 3 bit layer number), HARQ process number (e.g., 4 bit HARQ process number), validation bits (e.g., about 7 10 bit validation bits), and/or the like. In an example, the DCI for GUL activation and/or release (e.g., GUL-activation DCI and/or GUL-release DCI) may comprise a total of about 23 to 28 bits.

In some embodiments, DCIs for GUL activation and/or release (e.g., GUL-activation DCI and/or GUL-release DCI) may comprise one or more of: MCS bits (e.g., 5 MCS bits), DMRS bits (e.g., 3 bit in legacy LTE or 6 bits, 6 bits to support 24 dynamic DMRS configuration, e.g., 12 cyclic shift*2 OCC (orthogonal cover code)), TB number configuration bits (e.g., 1 bit having value "0" for 1 TB and "1" for 2 TBs, or vice versa), layer number bits (e.g., 3 bits), HARQ process number (e.g., 4 bits), validation bits (e.g., between 7 to 10 bits), and/or the like. In an example, a DCI for GUL activation and/or release (e.g., GUL-activation DCI and/or GUL-release DCI) may comprise a total of about 23 to 28 bits.

In some embodiments, a DCI for GUL activation and a DCI for GUL release (e.g., GUL-activation DCI and GUL-release DCI) may be two separate DCI, with the same length as the G-DCI (e.g., to reduce blind detection complexity). In some embodiments, DCI format 0A, 0B, 4A, 4B may be enough to contain the fields of the DCI for GUL activation and the DCI for GUL release.

In some embodiments, a DCI for GUL activation and/or a DCI for GUL release may be distinguished from a G-DCI using one of a variety of manners. As an example, a DCI in GUL scenarios may comprise a flag. A first value of the flag (e.g., a value of 1) may indicate that the DCI is a G-DCI; and a second value of the flag (e.g., a value of 0) may indicate that the DCI is a DCI for GUL activation and/or a DCI for GUL release.

In another example, a differential scrambling sequence used by a DCI may indicate a type of the DCI. For example, a DCI for activation or release may use different scrambling sequence than that used by the G-DCI, e.g., to indicate a type of the DCI. The scrambling sequence used for the DCI for activation or release or in the G-DCI may be different from scrambling sequences used in scheduled UL transmission in unlicensed spectrum, and may be different from scrambling sequences used in licensed spectrum.

In yet another example, a special field configuration in the DCI may be used to differentiate between various types of DCIs in GUL scenario (e.g., differentiate between G-DCI, DCI for GUL activation, and/or a DCI for GUL release). For example, Table 5 below illustrates a special field (e.g., bits 29, 30) appended to MCS index, which may distinguish between DCI for GUL activation and DCI for GUL release.

TABLE 5

| MCS index | 0~28 | 29 | 30 | 31 |
|---|---|---|---|---|
| meaning | MCS | Activation | Release | Reserve |

In some embodiments, a new Radio Network Temporary Identifier (RNTI) specific for grant less UL transmission (e.g., a GUL C-RNTI) may be configured by the eNB through high layer signaling. This RNTI (e.g., the GUL C-RNTI) may be the same as, or different from, semi-persistent scheduling (SPS) C-RNTI. In some embodiments, G-DCI may reuse the SPS scrambling ID.

Various embodiments may also fall within one or more of the types discussed herein.

Figure 2:
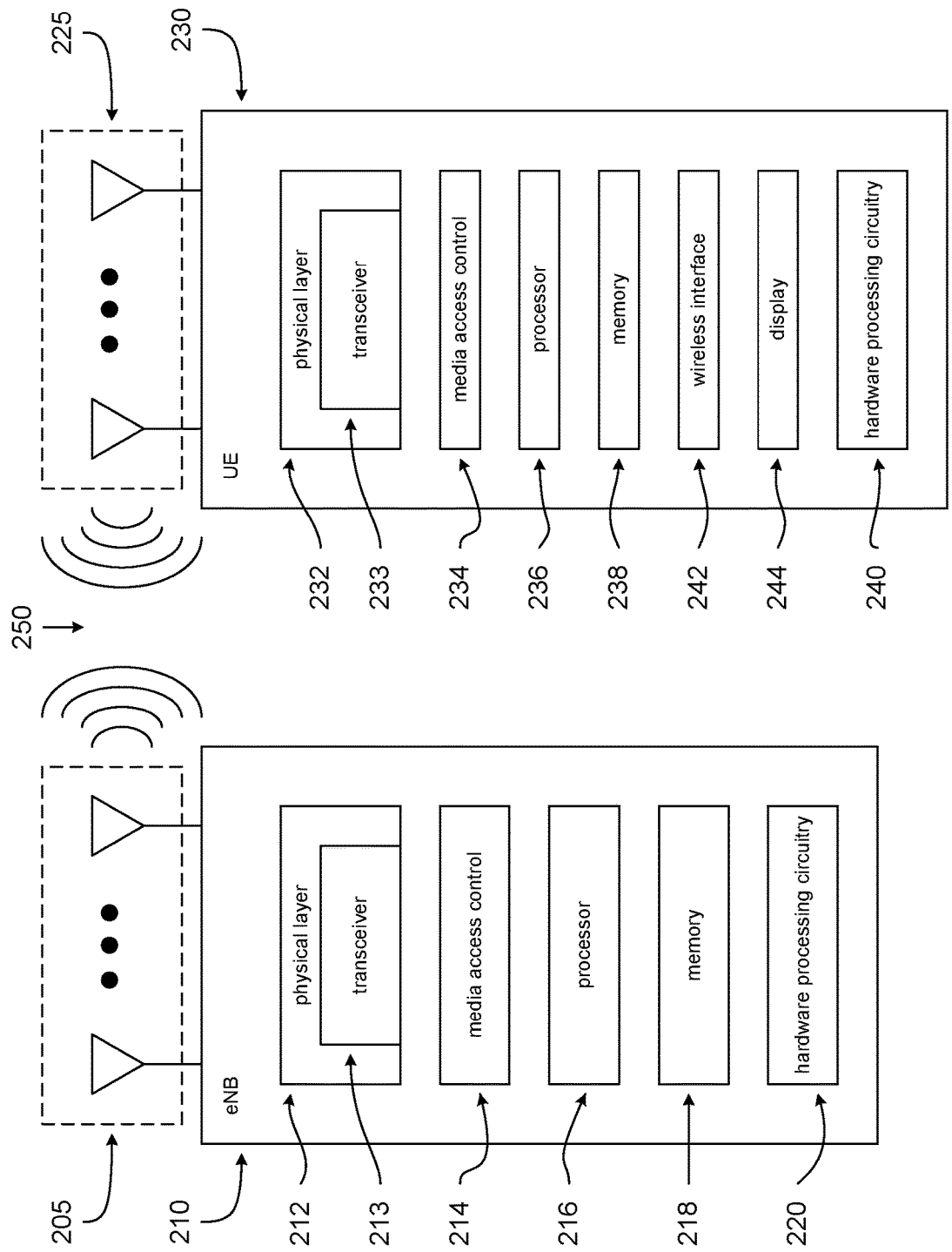
FIG. 2 illustrates an eNB and a UE, in accordance with some embodiments of the disclosure.

FIG. 2 illustrates an eNB and a UE, in accordance with some embodiments of the disclosure. FIG. 2 includes block diagrams of an eNB 210 and a UE 230 which are operable to co-exist with each other and other elements of an LTE network. High-level, simplified architectures of eNB 210 and UE 230 are described so as not to obscure the embodiments. It should be noted that in some embodiments, eNB 210 may be a stationary non-mobile device.

eNB 210 is coupled to one or more antennas 205, and UE 230 is similarly coupled to one or more antennas 225. However, in some embodiments, eNB 210 may incorporate or comprise antennas 205, and UE 230 in various embodiments may incorporate or comprise antennas 225.

In some embodiments, antennas 205 and/or antennas 225 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 205 are separated to take advantage of spatial diversity.

eNB 210 and UE 230 are operable to communicate with each other on a network, such as a wireless network. eNB 210 and UE 230 may be in communication with each other over a wireless communication channel 250, which has both a downlink path from eNB 210 to UE 230 and an uplink path from UE 230 to eNB 210.

As illustrated in FIG. 2, in some embodiments, eNB 210 may include a physical layer circuitry 212, a MAC (media access control) circuitry 214, a processor 216, a memory 218, and a hardware processing circuitry 220. A person skilled in the art will appreciate that other components not shown may be used in addition to the components shown to form a complete eNB.

In some embodiments, physical layer circuitry 212 includes a transceiver 213 for providing signals to and from UE 230. Transceiver 213 provides signals to and from UEs or other devices using one or more antennas 205. In some embodiments, MAC circuitry 214 controls access to the wireless medium. Memory 218 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 220 may comprise logic devices or circuitry to perform various operations. In some embodiments, processor 216 and memory 218 are arranged to perform the operations of hardware processing circuitry 220, such as operations described herein with reference to logic devices and circuitry within eNB 210 and/or hardware processing circuitry 220.

Accordingly, in some embodiments, eNB 210 may be a device comprising an application processor, a memory, one or more antenna ports, and an interface for allowing the application processor to communicate with another device.

As is also illustrated in FIG. 2, in some embodiments, UE 230 may include a physical layer circuitry 232, a MAC circuitry 234, a processor 236, a memory 238, a hardware processing circuitry 240, a wireless interface 242, and a display 244. A person skilled in the art would appreciate that other components not shown may be used in addition to the components shown to form a complete UE.

In some embodiments, physical layer circuitry 232 includes a transceiver 233 for providing signals to and from eNB 210 (as well as other eNBs). Transceiver 233 provides signals to and from eNBs or other devices using one or more antennas 225. In some embodiments, MAC circuitry 234 controls access to the wireless medium. Memory 238 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 242 may be arranged to allow the processor to communicate with another device. Display 244 may provide a visual and/or tactile display for a user to interact with UE 230, such as a touch-screen display. Hardware processing circuitry 240 may comprise logic devices or circuitry to perform various operations. In some embodiments, processor 236 and memory 238 may be arranged to perform the operations of hardware processing circuitry 240, such as operations described herein with reference to logic devices and circuitry within UE 230 and/or hardware processing circuitry 240.

Accordingly, in some embodiments, UE 230 may be a device comprising an application processor, a memory, one or more antennas, a wireless interface for allowing the application processor to communicate with another device, and a touch-screen display.

Elements of FIG. 2, and elements of other figures having the same names or reference numbers, can operate or function in the manner described herein with respect to any such figures (although the operation and function of such elements is not limited to such descriptions). For example, FIGS. 3 and 6-7 also depict embodiments of eNBs, hardware processing circuitry of eNBs, UEs, and/or hardware processing circuitry of UEs, and the embodiments described with respect to FIG. 2 and FIGS. 3 and 6-7 can operate or function in the manner described herein with respect to any of the figures.

In addition, although eNB 210 and UE 230 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 3:
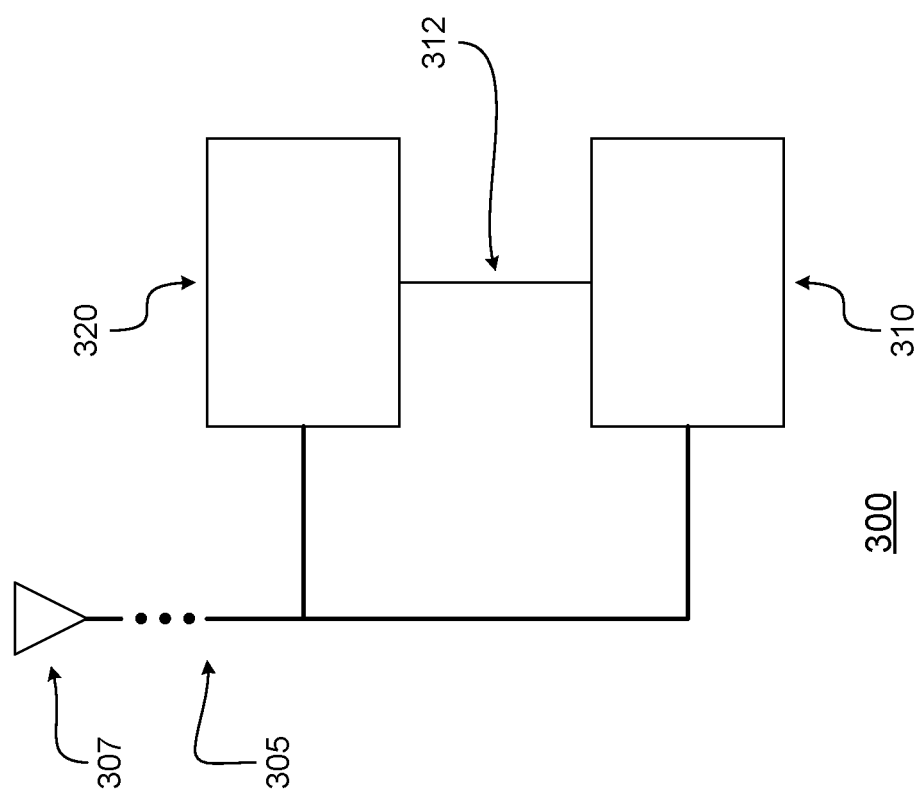
FIG. 3 illustrates hardware processing circuitries for a UE for Grant-less Uplink (GUL) activation, GUL release, and/or GUL transmission, in accordance with some embodiments of the disclosure.

FIG. 3 illustrates hardware processing circuitries for a UE for GUL activation, GUL release, and/or GUL transmission, in accordance with some embodiments of the disclosure. With reference to FIG. 2, a UE may include various hardware processing circuitries discussed herein (such as hardware processing circuitry 300 of FIG. 3), which may in turn comprise logic devices and/or circuitry operable to perform various operations. For example, in FIG. 2, UE 230 (or various elements or components therein, such as hardware processing circuitry 240, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 236 (and/or one or more other processors which UE 230 may comprise), memory 238, and/or other elements or components of UE 230 (which may include hardware processing circuitry 240) may be arranged to perform the operations of these hardware processing circuitries, such as operations described herein with reference to devices and circuitry within these hardware processing circuitries. In some embodiments, processor 236 (and/or one or more other processors which UE 230 may comprise) may be a baseband processor.

Returning to FIG. 3, an apparatus of UE 230 (or another UE or mobile handset), which may be operable to communicate with one or more eNBs on a wireless network, may comprise hardware processing circuitry 300. In some embodiments, hardware processing circuitry 300 may comprise one or more antenna ports 305 operable to provide various transmissions over a wireless communication channel (such as wireless communication channel 250). Antenna ports 305 may be coupled to one or more antennas 307 (which may be antennas 225). In some embodiments, hardware processing circuitry 300 may incorporate antennas 307, while in other embodiments, hardware processing circuitry 300 may merely be coupled to antennas 307.

Antenna ports 305 and antennas 307 may be operable to provide signals from a UE to a wireless communications channel and/or an eNB, and may be operable to provide signals from an eNB and/or a wireless communications channel to a UE. For example, antenna ports 305 and antennas 307 may be operable to provide transmissions from UE 230 to wireless communication channel 250 (and from there to eNB 210, or to another eNB). Similarly, antennas 307 and antenna ports 305 may be operable to provide transmissions from a wireless communication channel 250 (and beyond that, from eNB 210, or another eNB) to UE 230.

Hardware processing circuitry 300 may comprise various circuitries operable in accordance with the various embodiments discussed herein. With reference to FIG. 3, hardware processing circuitry 300 may comprise a first circuitry 310 and/or a second circuitry 320.

In some embodiments, the first circuitry 310 may be operable to process a first DCI format 0A transmission indicating an SPS activation. First circuitry 310 may also be operable to process a first DCI format 0A transmission indicating a GUL activation, and process a second DCI format 0A transmission indicating a GUL release. Second circuitry 320 may be operable to generate UL transmissions for an unlicensed spectrum of the wireless network after the GUL activation and before the GUL release. Hardware processing circuitry 300 may also comprise an interface for sending UL transmissions to a transmission circuitry and for receiving DCI format 0A transmissions from a receiving circuitry.

First circuitry 310 may be operable to process a third DCI format 0A transmission, wherein the third DCI format 0A transmission is a GUL-DCI comprising a UE-specific parameter associated with the UL transmissions for the unlicensed spectrum. In some embodiments, the third DCI formal 0A transmission may comprises one or more flags to specify that the third DCI formal 0A transmission is a GUL-DCI (G-DCI) transmission. In some embodiments, the UE-specific parameter of the GUL-DCI may comprise one or more bits for HARQ ACK bitmap associated with the UL transmissions for the unlicensed spectrum. In some embodiments, the UE-specific parameter of the GUL-DCI may comprise one or more of: one or more bits for TPC associated with the UL transmissions in the unlicensed spectrum, or one or more bits for associated with a MCS used for transmissions in the unlicensed spectrum. In some embodiments, the third DCI format 0A transmission may be processed after sending the one or more UL transmissions and before processing the second DCI format 0A transmission. In some embodiments, the third DCI format 0A transmission may comprise a plurality of redundant bits, which may not be used to transmit any meaningful information and which may be set to zero. In some embodiments, a flag in the first DCI format 0A transmission may indicate that the first DCI format 0A transmission is for GUL activation or GUL release; and the flag in the third DCI format 0A transmission may indicate that the third DCI format 0A transmission is the GUL-DCI. In some embodiments, the flag in the second DCI format 0A transmission may indicate that the second DCI format 0A transmission is for GUL activation or GUL release.

In some embodiments, the UL transmissions may comprise at least one of: one or more Physical Uplink Shared Channel (PUSCH) transmissions, or one or more Physical Uplink Control Channel (PUCCH) transmissions, which are transmitted without any UL grant from the eNB for UL transmission. In some embodiments, the first circuitry 310, the second circuitry 320, and/or another component of the UE may be operable to facilitate performing a listen-before-talk (LBT) procedure on the unlicensed spectrum to determine if one of the channels in the unlicensed spectrum is available; and facilitate sending of the UL transmissions without a prior UL grant, upon a determination that the one of the channels in the unlicensed spectrum is available. In some embodiments, the first DCI format 0A transmission and second DCI format 0A transmission are received over the unlicensed spectrum.

In some embodiments, first circuitry 310 and/or second circuitry 320 may be implemented as separate circuitries. In other embodiments, first circuitry 310 and/or second circuitry 320 may be combined and implemented together in a circuitry without altering the essence of the embodiments.

Figure 4:
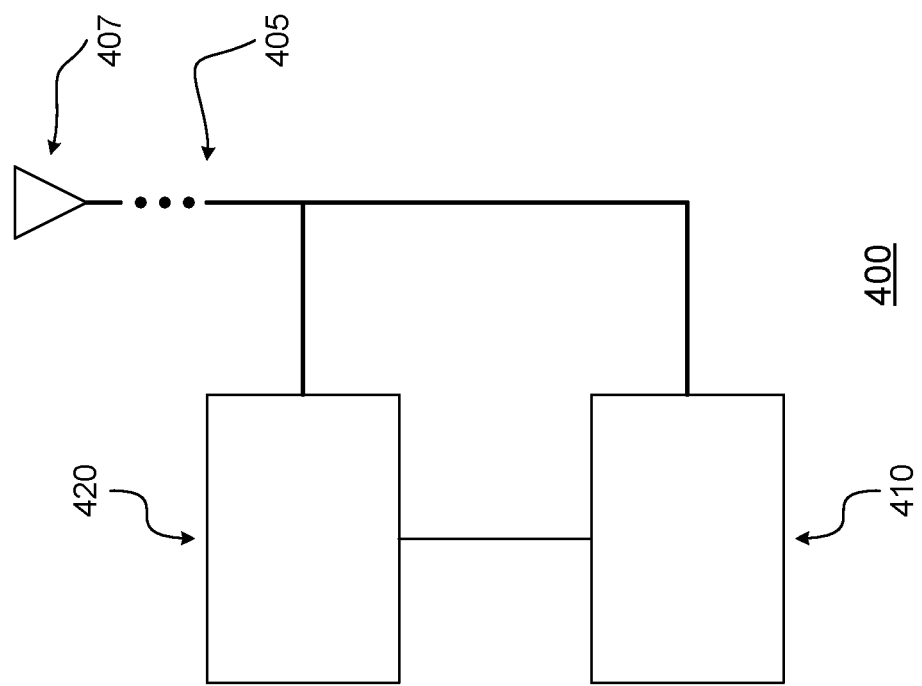
FIG. 4 illustrates hardware processing circuitries for an eNB for generating Downlink Control Information (DCI) for GUL activation, DCI for GUL release, and G-DCI, according to some embodiments.

FIG. 4 illustrates hardware processing circuitries for an eNB for generating DCIs for GUL activation, DCIs for GUL release, and G-DCIs, according to some embodiments. With reference to FIG. 2, an eNB may include various hardware processing circuitries discussed below, which may in turn comprise logic devices and/or circuitry operable to perform various operations. For example, in FIG. 2, eNB 210 (or various elements or components therein, such as hardware processing circuitry 220, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 216 (and/or one or more other processors which eNB 210 may comprise), memory 218, and/or other elements or components of eNB 210 (which may include hardware processing circuitry 220) may be arranged to perform the operations of these hardware processing circuitries, such as operations described herein with reference to devices and circuitry within these hardware processing circuitries. In some embodiments, processor 216 (and/or one or more other processors which eNB 210 may comprise) may be a baseband processor.

Returning to FIG. 4, an apparatus of eNB 410 (or another eNB or base station), which may be operable to communicate with one or more UEs on a wireless network, may comprise hardware processing circuitry 400. In some embodiments, hardware processing circuitry 400 may comprise one or more antenna ports 405 operable to provide various transmissions over a wireless communication channel (such as wireless communication channel 250). Antenna ports 405 may be coupled to one or more antennas 407 (which may be antennas 205). In some embodiments, hardware processing circuitry 400 may incorporate antennas 407, while in other embodiments, hardware processing circuitry 400 may merely be coupled to antennas 407.

Antenna ports 405 and antennas 407 may be operable to provide signals from an eNB to a wireless communications channel and/or a UE, and may be operable to provide signals from a UE and/or a wireless communications channel to an eNB. For example, antenna ports 405 and antennas 407 may be operable to provide transmissions from eNB 210 to wireless communication channel 250 (and from there to UE 230, or to another UE). Similarly, antennas 407 and antenna ports 405 may be operable to provide transmissions from a wireless communication channel 250 (and beyond that, from UE 230, or another UE) to eNB 210.

Hardware processing circuitry 400 may comprise various circuitries operable in accordance with the various embodiments discussed herein. With reference to FIG. 4, hardware processing circuitry 400 may comprise a first circuitry 410 and a second circuitry 420.

In some embodiments, the first circuitry 410 may be operable to generate a first Downlink Control Information (DCI) indicating a Grant-less Uplink (GUL) activation. In some embodiments, the first circuitry 410 may also be operable to generate a second DCI comprising one or more UE-specific parameters associated with one or more GUL Uplink (UL) transmissions on an unlicensed spectrum of the wireless network. A flag in the first DCI may indicate that the first DCI is for GUL activation or GUL release, and the flag in the second DCI may indicate that the second DCI is a GUL-DCI (G-DCI) comprising the one or more UE-specific parameters. Hardware processing circuitry 400 may also comprise an interface for outputting the first and second DCIs to a transceiver circuitry, for transmission to the UE.

In some embodiments, the first circuitry 410 may also be operable to generate a third DCI indicating a GUL release. In some embodiments, individual ones of the first and second DCI may have a DCI format 0A. In some embodiments, the second circuitry 420 may be operable to process one or more UL transmissions on the unlicensed spectrum of the wireless network, after generation of the first DCI and before generation of the second DCI. In some embodiments, the second DCI may comprise one or more of: HARQ ACK bitmap feedback comprising 2*N bits, where N is a number of configured HARQ process identifications (IDs) for grant-less transmissions; TPC command comprising 2 bits; or MCS information comprising one of 5 bits or 10 bits. In some embodiments, to generate the first DCI indicating the GUL activation, the first circuitry 410 may set one or more bits of the first DCI to zeros, such that a length of the first DCI corresponds to a pre-defined length of a format 0A DCI. In some embodiments, to generate the first DCI indicating the GUL activation, the first circuitry 410 may scramble the first DCI using a Radio Network Temporary Identifier (RNTI) that is specific to GUL transmission.

In some embodiments, first circuitry 410 and second circuitry 420 may be implemented as separate circuitries. In other embodiments, first circuitry 410 and second circuitry 420 may be combined and implemented together in a circuitry without altering the essence of the embodiments.

Figure 5A:
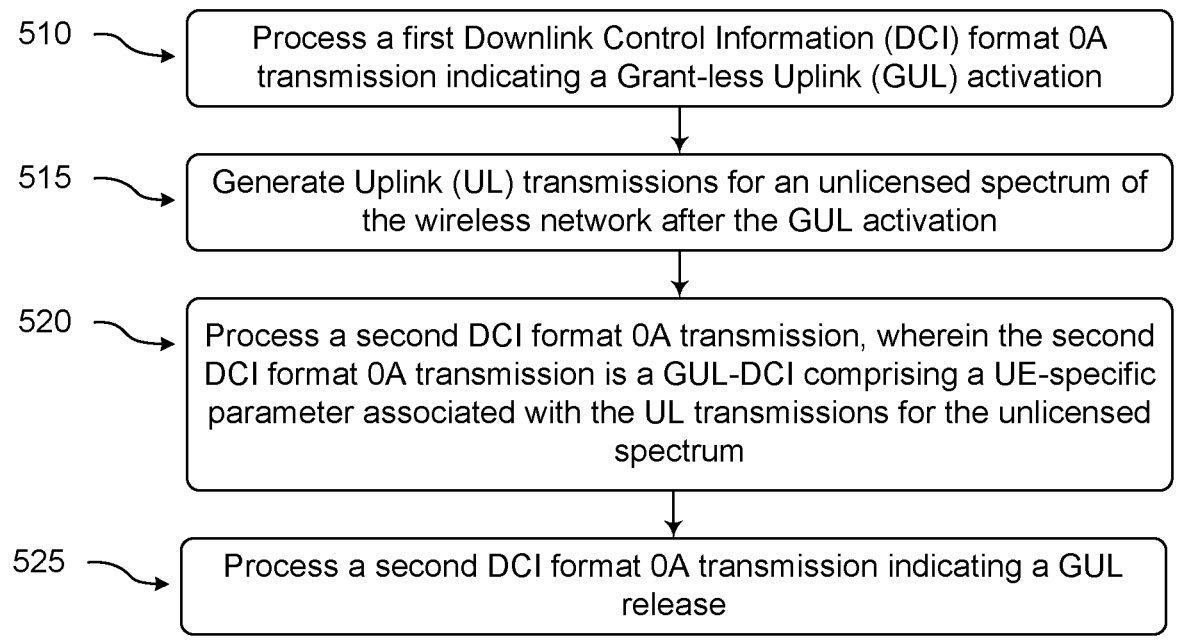
FIG. 5A illustrates methods for a UE for processing a DCI for GUL activation, a G-DCI, and/or a DCI for GUL release, in accordance with some embodiments of the disclosure.

FIG. 5A illustrates methods for a UE for processing a DCI for GUL activation, a G-DCI, and/or a DCI for GUL release, in accordance with some embodiments of the disclosure. With reference to FIG. 2, methods that may relate to UE 230 and hardware processing circuitry 240 are discussed herein. Although the actions in method 500a of FIG. 5A are shown in a particular order, the order of the actions can be modified. Thus, the illustrated embodiments can be performed in a different order, and some actions may be performed in parallel. Some of the actions and/or operations listed in FIG. 5A are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 230 and/or hardware processing circuitry 240 to perform an operation comprising the methods of FIG. 5A. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media. In some embodiments, an apparatus may comprise means for performing various actions and/or operations of the methods of FIG. 5A.

In some embodiments, the method 500a may comprise, at 510, processing a first DCI format 0A transmission indicating a Grant-less Uplink (GUL) activation. The method 500a may further comprise, at 515, generating UL transmissions for an unlicensed spectrum of the wireless network after the GUL activation. The method 500a may further comprise, at 520, processing a second DCI format 0A transmission, wherein the second DCI format 0A transmission may be a GUL-DCI comprising one or more UE-specific parameters associated with the UL transmissions for the unlicensed spectrum. The method 500a may further comprise, at 525, processing a third DCI format 0A transmission indicating a GUL release.

In some embodiments, the second DCI formal 0A transmission may comprise one or more flags to specify that the second DCI formal 0A transmission is a GUL-DCI (G-DCI) transmission. In some embodiments, the UE-specific parameter of the GUL-DCI may comprise one or more of: one or more bits for HARQ ACK bitmap associated with the UL transmissions for the unlicensed spectrum, one or more bits for TPC associated with the UL transmissions in the unlicensed spectrum, or one or more bits for associated with a MCS used for transmissions in the unlicensed spectrum. In some embodiments, the second DCI format 0A transmission may be processed after sending the one or more UL transmissions and before processing the third DCI format 0A transmission. In some embodiments, the first DCI formal 0A transmission may comprise a flag to specify whether the first DCI format 0A transmission is associated with a GUL activation, a GUL release, or a GUL-DCI (G-DCI) comprising control information associated with GUL transmission.

Figure 5B:
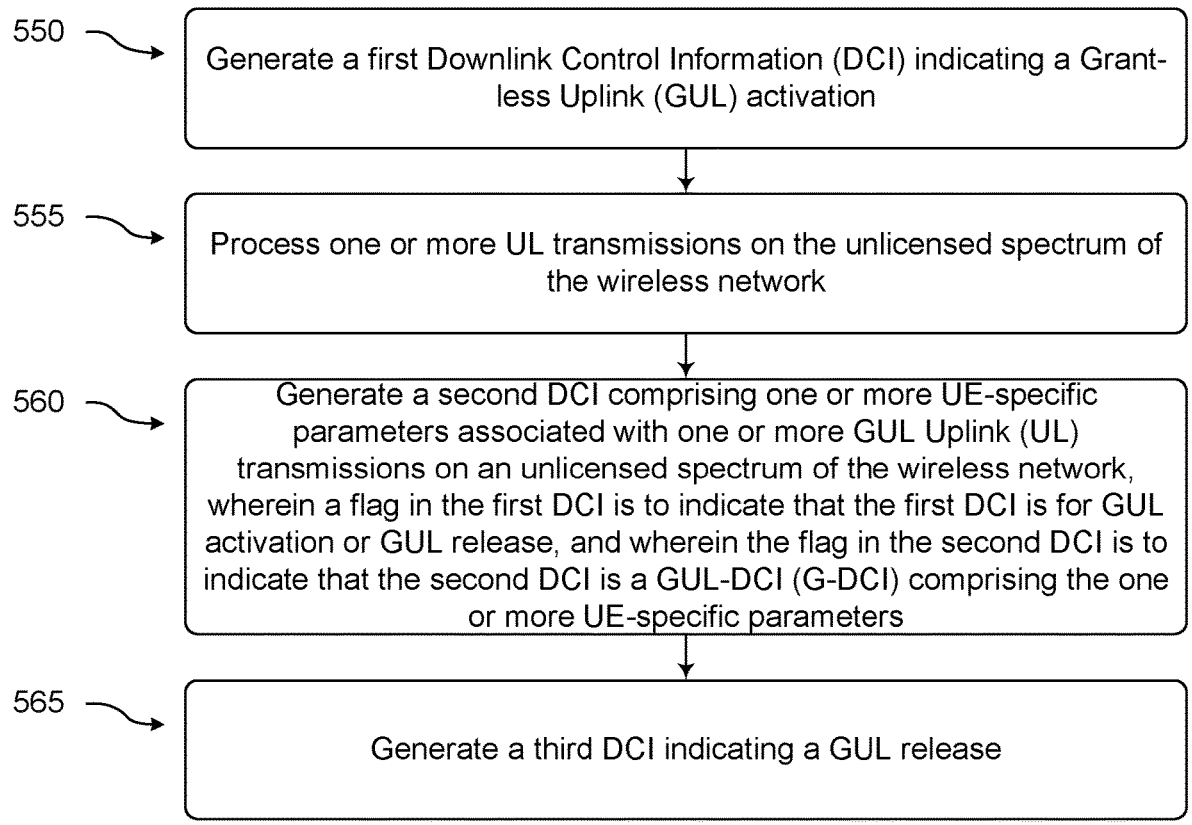
FIG. 5B illustrates methods for an eNB for generating DCIs for GUL activation, DCIs for GUL release, and G-DCIs, in accordance with some embodiments of the disclosure.

FIG. 5B illustrates methods 500b for an eNB for generating DCIs for GUL activation, DCIs for GUL release, and G-DCIs, in accordance with some embodiments of the disclosure. With reference to FIG. 4, various methods that may relate to eNB 210 and hardware processing circuitry 220 are discussed below. Although the actions in methods are shown in a particular order, the order of the actions can be modified. Thus, the illustrated embodiments can be performed in a different order, and some actions may be performed in parallel. Some of the actions and/or operations listed in FIG. 5B are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 210 and/or hardware processing circuitry 220 to perform an operation comprising the methods of FIG. 5B. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods 500b of FIG. 5B.

Returning to FIG. 5B, various methods may be in accordance with the various embodiments discussed herein.

In some embodiments, the method 500b may comprise, at 550, generating a first Downlink Control Information (DCI) indicating a Grant-less Uplink (GUL) activation. In some embodiments, the method 500b may comprise, at 555, processing one or more UL transmissions on the unlicensed spectrum of the wireless network, after generation of the first DCI and before generation of a second DCI. In some embodiments, the method 500b may comprise, at 560, generating a second DCI comprising one or more UE-specific parameters associated with one or more GUL Uplink (UL) transmissions on an unlicensed spectrum of the wireless network. In some embodiments, a flag in the first DCI may indicate that the first DCI is for GUL activation or GUL release, and the flag in the second DCI may indicate that the second DCI is a GUL-DCI (G-DCI) comprising the one or more UE-specific parameters. In some embodiments, an interface may output the first and second DCIs to a transceiver circuitry, for transmission to the UE. In some embodiments, the method 500b may comprise, at 565, generating a third DCI indicating a GUL release.

In some embodiments, individual ones of the first and second DCI may have a DCI format 0A. In some embodiments, the second DCI may comprise one or more of: HARQ ACK bitmap feedback comprising 2*N bits, where N is a number of configured HARQ process IDs for grant-less transmissions; TPC command comprising 2 bits; or MCS information comprising one of 5 bits or 10 bits. In some embodiments, generating the first DCI indicating the GUL activation comprises setting one or more bits of the first DCI to zeros, such that a length of the first DCI corresponds to a pre-defined length of a format 0A DCI. In some embodiments, generating the first DCI indicating the GUL activation comprises scrambling the first DCI using a RNTI that is specific to GUL transmission.

Figure 6:
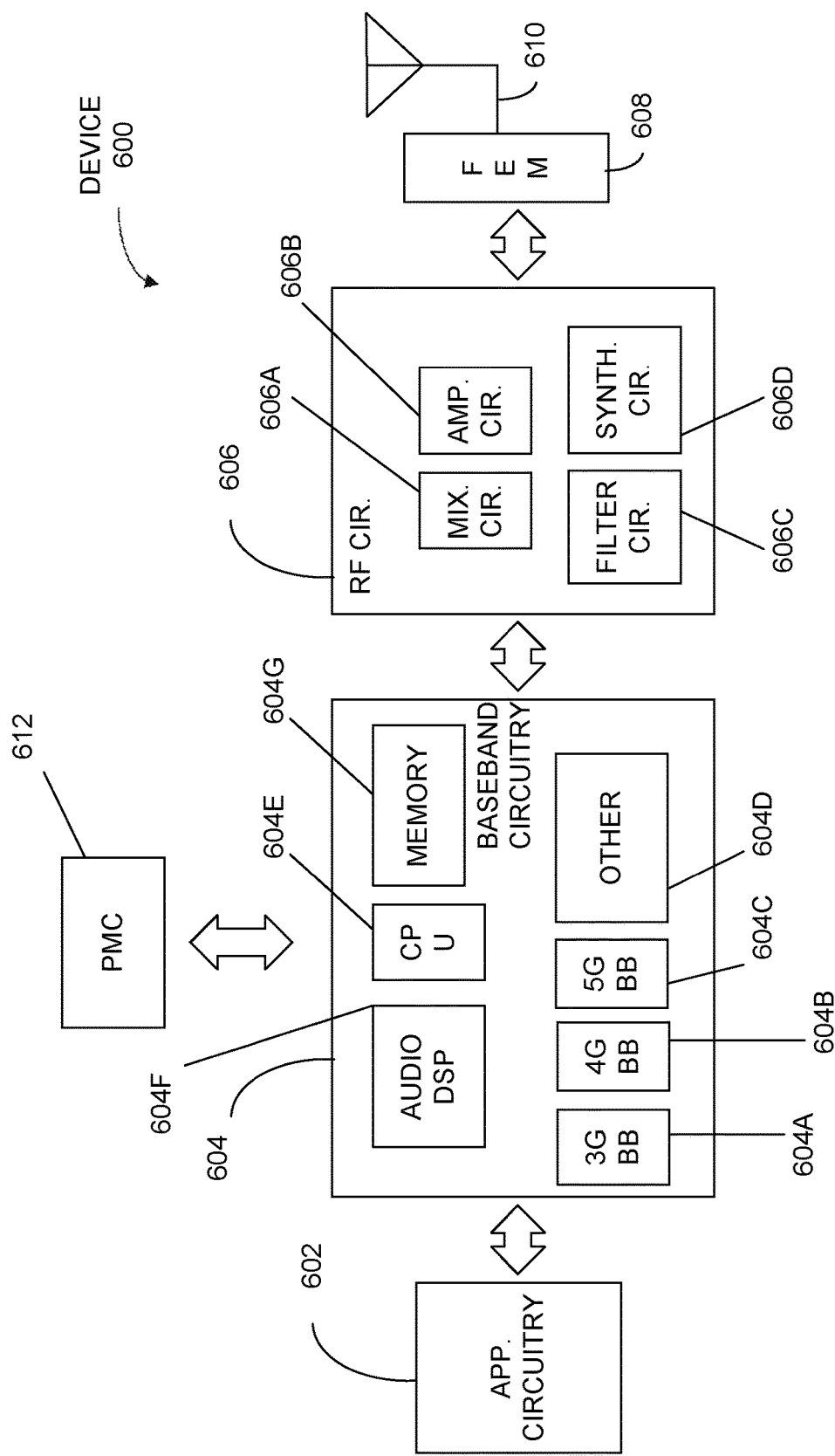
FIG. 6 illustrates example components of a device, in accordance with some embodiments of the disclosure.

FIG. 6 illustrates example components of a device, in accordance with some embodiments of the disclosure. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), and so on). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, and so on. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, and so on to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606A, amplifier circuitry 606B and filter circuitry 606C. In some embodiments, the transmit signal path of the RF circuitry 606 may include filter circuitry 606C and mixer circuitry 606A. RF circuitry 606 may also include synthesizer circuitry 606D for synthesizing a frequency for use by the mixer circuitry 606A of the receive signal path and the transmit signal path. In some embodiments, the mixer circuitry 606A of the receive signal path may be configured to down-convert RF signals received from the FEM circuitry 608 based on the synthesized frequency provided by synthesizer circuitry 606D. The amplifier circuitry 606B may be configured to amplify the down-converted signals and the filter circuitry 606C may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606A of the receive signal path may comprise passive mixers, although the scope of the embodiments is not limited in this respect.

In some embodiments, the mixer circuitry 606A of the transmit signal path may be configured to up-convert input baseband signals based on the synthesized frequency provided by the synthesizer circuitry 606D to generate RF output signals for the FEM circuitry 608. The baseband signals may be provided by the baseband circuitry 604 and may be filtered by filter circuitry 606C.

In some embodiments, the mixer circuitry 606A of the receive signal path and the mixer circuitry 606A of the transmit signal path may include two or more mixers and may be arranged for quadrature downconversion and upconversion, respectively. In some embodiments, the mixer circuitry 606A of the receive signal path and the mixer circuitry 606A of the transmit signal path may include two or more mixers and may be arranged for image rejection (e.g., Hartley image rejection). In some embodiments, the mixer circuitry 606A of the receive signal path and the mixer circuitry 606A may be arranged for direct downconversion and direct upconversion, respectively. In some embodiments, the mixer circuitry 606A of the receive signal path and the mixer circuitry 606A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606D may be a fractional-N synthesizer or a fractional N/N+1 synthesizer, although the scope of the embodiments is not limited in this respect as other types of frequency synthesizers may be suitable. For example, synthesizer circuitry 606D may be a delta-sigma synthesizer, a frequency multiplier, or a synthesizer comprising a phase-locked loop with a frequency divider.

The synthesizer circuitry 606D may be configured to synthesize an output frequency for use by the mixer circuitry 606A of the RF circuitry 606 based on a frequency input and a divider control input. In some embodiments, the synthesizer circuitry 606D may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606D of the RF circuitry 606 may include a divider, a delay-locked loop 'L), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, and so on. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
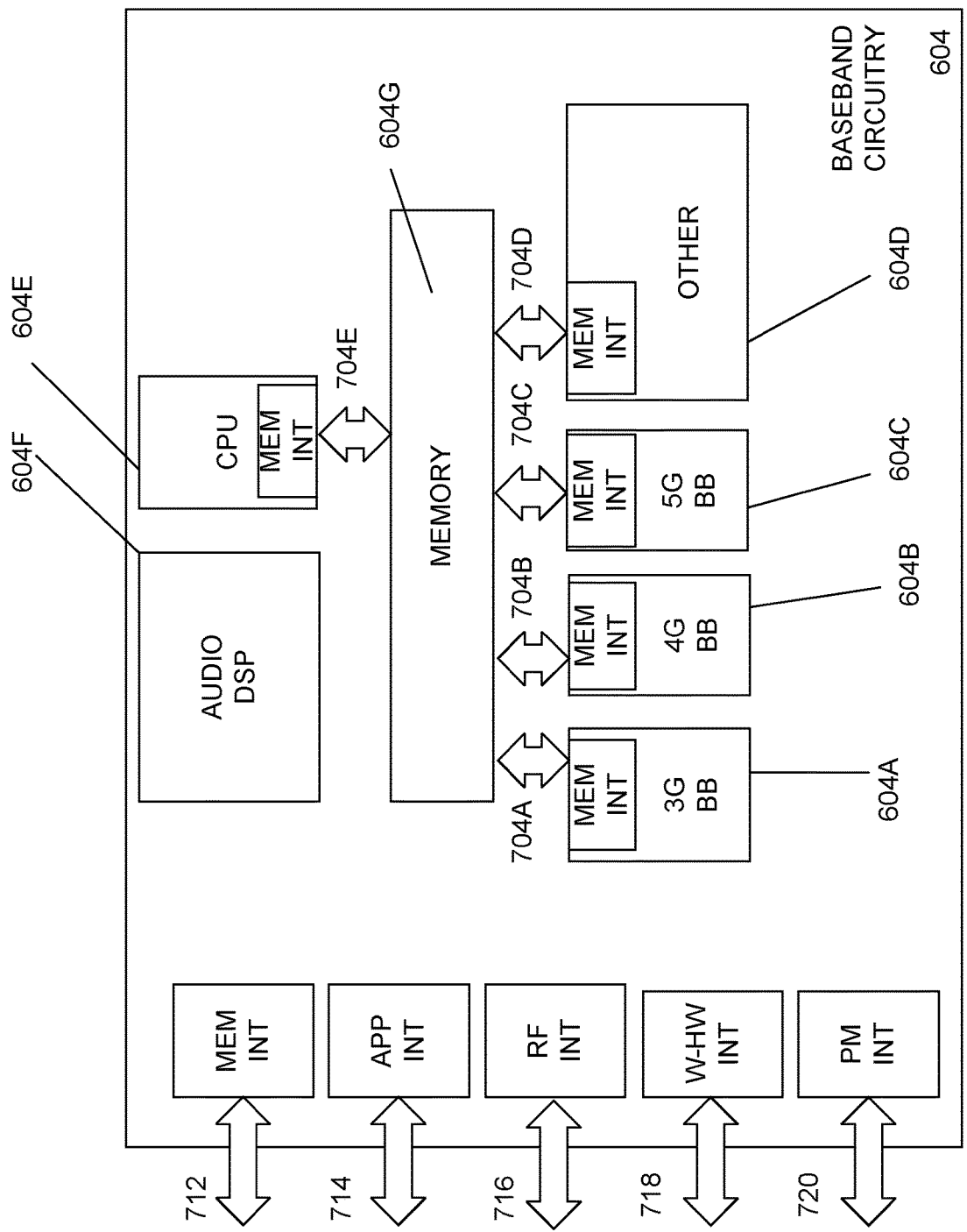
FIG. 7 illustrates example interfaces of baseband circuitry, in accordance with some embodiments of the disclosure.

FIG. 7 illustrates example interfaces of baseband circuitry, in accordance with some embodiments of the disclosure. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

All optional features of the apparatus described herein may also be implemented with respect to a method or process.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) for communicating with a base station on a wireless network, the UE comprising:
   one or more processors configured to:
      process a first Downlink Control Information (DCI) format 0A transmission indicating a Grant-less Uplink (GUL) activation,
      generate one or more Uplink (UL) transmissions for an unlicensed spectrum of the wireless network responsive to the GUL activation,
      process a second DCI format 0A transmission after sending the one or more UL transmissions, the second DCI format 0A transmission being a GUL-DCI (G-DCI) transmission in a G-DCI format comprising one or more UE-specific parameters associated with the one or more UL transmissions and a plurality of redundant bits to cause the second DCI format 0A transmission to be a pre-determined length, wherein the pre-determined length is determined based on a bandwidth of the unlicensed spectrum used for the G-DCI transmission, and process a third DCI format 0A transmission indicating a GUL release; and an interface configured to:
send the one or more UL transmissions to a transmission circuitry, and
receive the first DCI format 0A transmission and the second DCI format 0A transmission from a receiving circuitry.

2. The UE of claim 1, wherein the second DCI format 0A transmission comprises one or more flags to specify that the second DCI format 0A transmission is the G-DCI transmission.

3. The UE of claim 1, wherein the one or more UE-specific parameters comprise one or more bits for a Hybrid Automatic Repeat Request (HARQ) Acknowledgement (ACK) bitmap associated with the one or more UL transmissions.

4. The UE of claim 1, wherein the one or more UE-specific parameters comprise one or more of:
one or more bits for Transmit Power Control (TPC) associated with the one or more UL transmissions-or one or more bits associated with a Modulation and Coding Scheme (MCS) used for transmissions in the unlicensed spectrum.

5. The UE of claim 1, wherein the one or more processors are configured to process the second DCI format 0A transmission before processing the third DCI format 0A transmission.

6. The UE of claim 1, wherein the plurality of redundant bits comprises a plurality of dummy bits set to zero.

7. The UE of claim 1, wherein:
a flag in the first DCI format 0A transmission is to indicate that the first DCI format 0A transmission is for the GUL activation; and
a flag in the second DCI format 0A transmission is to indicate that the second DCI format 0A transmission is the G-DCI transmission.

8. The UE of claim 7, wherein a flag in the third DCI format 0A transmission is to indicate that the third DCI format 0A transmission is for the GUL release.

9. The UE of claim 1, wherein the one or more UL transmissions comprise at least one of: one or more Physical Uplink Shared Channel (PUSCH) transmissions or one or more Physical Uplink Control Channel (PUCCH) transmissions, which are for transmission without any UL grant from the base station.

10. The UE of claim 1, wherein the one or more processors are further configured to:
facilitate performing a listen-before-talk (LBT) procedure on the unlicensed spectrum to determine if a channel in the unlicensed spectrum is available; and
facilitate sending of the one or more UL transmissions without a prior UL grant upon a determination that the channel in the unlicensed spectrum is available.

11. The UE of claim 1, wherein the first DCI format 0A transmission and the third DCI format 0A transmission are received over the unlicensed spectrum.

12. A non-transitory machine readable storage media having machine executable instructions that, when executed, cause one or more processors of a User Equipment (UE) operable to communicate with a base station on a wireless network to perform operations, the operations comprising:
processing a first Downlink Control Information (DCI) format 0A transmission indicating a Grant-less Uplink (GUL) activation;
generating one or more Uplink (UL) transmissions for an unlicensed spectrum of the wireless network responsive to the GUL activation;
processing a second DCI format 0A transmission after sending the one or more UL transmissions, the second DCI format 0A transmission being a GUL-DCI (G-DCI) transmission in a G-DCI format comprising one or more UE-specific parameters associated with the one or more UL transmissions and a plurality of redundant bits to cause the second DCI format 0A transmission to be a pre-determined length, wherein the pre-determined length is determined based on a bandwidth of the unlicensed spectrum used for the G-DCI transmission; and
processing a third DCI format 0A transmission indicating a GUL release.

13. The non-transitory machine readable storage media of claim 12, wherein the second DCI format 0A transmission comprises one or more flags to specify that the second DCI format 0A transmission is the G-DCI transmission.

14. The non-transitory machine readable storage media of claim 12, wherein the one or more UE-specific parameters comprise one or more of:
one or more bits for a Hybrid Automatic Repeat Request (HARQ) Acknowledgement (ACK) bitmap associated with the one or more UL transmissions;
one or more bits for Transmit Power Control (TPC) associated with the one or more UL transmissions; or
one or more bits associated with a Modulation and Coding Scheme (MCS) used for transmissions in the unlicensed spectrum.

15. The non-transitory machine readable storage media of claim 12, wherein the processing the second DCI format 0A transmission comprises:
processing the second DCI format 0A transmission before processing the third DCI format 0A transmission.

16. The non-transitory machine readable storage media of claim 12, wherein the first DCI format 0A transmission comprises a flag to indicate that the first DCI format 0A transmission is associated with the GUL activation; and
wherein the second DCI format 0A transmission comprises a flag to indicate that the second DCI format 0A transmission is the G-DCI transmission.

17. A base station for communicating with a User Equipment (UE) on a wireless network, the base station comprising:
one or more processors configured to:
generate a first Downlink Control Information (DCI) indicating a Grant-less Uplink (GUL) activation; and
generate a second DCI being a GUL-DCI (G-DCI) transmission in a G-DCI format comprising one or more UE-specific parameters associated with one or more Uplink (UL) transmissions for an unlicensed spectrum of the wireless network and a plurality of redundant bits to cause the second DCI to be a pre-determined length, wherein the pre-determined length is determined based on a bandwidth of the unlicensed spectrum used for the G-DCI transmission,
wherein a flag in the first DCI is to indicate that the first DCI is for the GUL activation, and wherein a flag in the second DCI is to indicate that the second DCI is a GUL DCI (G-DCI) comprising the one or more UE-specific parameters; and an interface configured to output the first DCI and the second DCI to a transceiver circuitry for transmission to the UE.

18. The base station of claim 17, wherein the one or more processors are configured to:

generate a third DCI indicating a GUL release.

19. The base station of claim 17, wherein the first DCI and the second DCI have a DCI format 0A.

20. The base station of claim 17, wherein the one or more processors are configured to:

process the one or more UL transmissions after generation of the first DCI and before generation of the second DCI.

21. The base station of claim 17, wherein the second DCI comprises one or more of:

a Hybrid Automatic Repeat Request (HARQ) Acknowledgement (ACK) bitmap feedback comprising 2*N bits, where N is a number of configured HARQ process identifications (IDs) for grant-less transmissions;

a Transmit Power Control (TPC) command comprising 2 bits; or a Modulation and coding scheme (MCS) information comprising one of 5 bits or 10 bits.

22. The base station of claim 17, wherein to generate the first DCI indicating the GUL activation, the one or more processors are configured to:

set the plurality of redundant bits to zeros such that a length of the second DCI corresponds to the pre-determined length, and wherein the pre-determined length comprises a pre-defined length of a format 0A DCI.

23. The base station of claim 17, wherein to generate the first DCI, the one or more processors are configured to:

scramble the first DCI using a Radio Network Temporary Identifier (RNTI) that is specific to GUL transmission.

* * * * *